Jan. 3, 1967 D. L. FAVIN 3,296,554
UNIJUNCTION TRANSISTOR RELAXATION OSCILLATOR WITH
SINE WAVE SYNCHRONIZATION
Filed Dec. 10, 1964 2 Sheets-Sheet 1

INVENTOR
D. L. FAVIN
BY
ATTORNEY

United States Patent Office 3,296,554

Patented Jan. 3, 1967

3,296,554

UNIJUNCTION TRANSISTOR RELAXATION OSCILLATOR WITH SINE WAVE SYNCHRONIZATION

David L. Favin, Whippany, N.J., assignor to Bell Telephone Laboratories, Incorporated, New York, N.Y., a corporation of New York Filed Dec. 10, 1964, Ser. No. 417,277
6 Claims. (Cl. 331—111)

Figure 1:
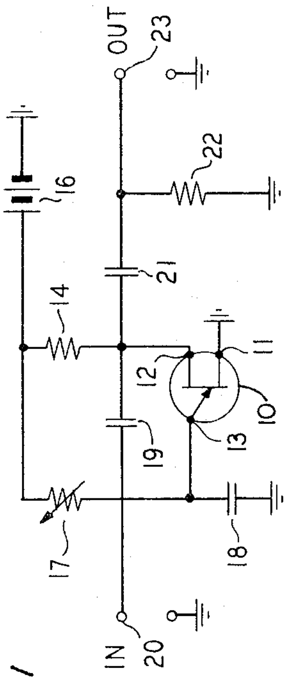

This invention relates to relaxation oscillator circuits which utilize semiconductor devices of the type known in the art as unijunction transistors. More particularly, the invention relates to the synchronization of this type of relaxation oscillator circuit to provide output pulses at a predetermined phase of an applied sinusoidal signal.

In phase and delay measurements, one technique of measuring the phase difference between two sinusoidal signals involves the derivation of pulses at the same fixed point of phase for each signal and a comparison of the pulse trains derived from each signal. In order to minimize the effect of amplitude changes in the signal the fixed point in phase at which a pulse is derived is generally chosen to be at one of the two points of inflection which occur during each cycle of the sinusoidal wave. These points of inflection are commonly known as the points of zero crossing, the term zero referring to the inflection point amplitude of a wave whose D.C. component is zero. In the past, pulses were derived at the zero crossings by differentiating the quasi-rectangular signal which results from amplifying and amplitude limiting the sinusoid. With finite amplification, the time at which the pulse occurs using the latter method is still dependent to a degree on the amplitude of the sinusoidal wave.

It is therefore one object of this invention to produce an output pulse during one of the zero crossings of an applied sinusoidal signal which is substantially independent of the applied signal's amplitude.

Another object of the invention is to provide output pulses at times which are independent of supply voltage variations.

These and other objects are accomplished in a unijunction transistor relaxation oscillator which is synchronized by an applied sinusoidal signal superimposed on the base-to-base voltage of the unijunction transistor. A resistor-reactor combination in the emitter circuit is adjusted so that the oscillator's unsynchronized pulse repetition period is equal to the period (reciprocal of frequency) of the applied sinusoid. As a result, the pulses which occur during conduction of the unijunction transistor are forced to occur in sychronism with the negative-going zero crossings of the applied sinusoidal signal.

In this specification, a "relaxation oscillator" is defined as an oscillator whose frequency of unsynchronized oscillations is determined by the time of charging or discharging of a capacitor or an inductor through a resistor. This resistor-reactor combination is generally used to provide a generally increasing voltage between the emitter and one base of an initially nonconductive unijunction transistor, the other base of which is fixed at a constant D.C. potential except for the short spike of voltage which occurs during the time when the transistor conducts and rapidly changes the charge on the capacitor. The unijunction transistor is a semiconductor device of the type shown in Patent 2,769,926 of November 6, 1956, to I. A. Lesk.

One feature of this invention is that pulses can be produced not only at the negative-going zero crossing but at other predetermined fixed points in phase of the applied sinusoidal signal.

Another feature of this invention is that the resistor-capacitor combination can be adjusted so that the circuit will not produce a pulse at every negative-going zero crossing but only after a predetermined number of zero crossings, thereby providing frequency division in addition to zero crossing detection.

The objects and advantages of the invention will be more clearly understood from a consideration of the following detailed description in connection with the attached drawings in which:

FIG. 1 is a schematic circuit diagram of a unijunction transistor relaxation oscillator synchronized in accordance with this invention; and FIGS. 2, 3, 4, and 5 are a series of curves useful in connection with the explanation of the invention.

Referring now to FIG. 1 of the drawings, a relaxation oscillator circuit includes a conventional unijunction transistor device 10 which, as is well understood in the art, comprises a body of one type of semiconductor material, such as N-type material. A pair of bilaterally conductive ohmic contacts are joined to opposite ends of the body in spaced relationship to one another, consisting of base-one contact 11 and base-two contact 12. Joined to the body intermediate contacts 11 and 12, is a rectifying contact or emitter 13, such as a dot of P-type material. Positive potential source 16, having its negative side connected to a point of reference potential, supplies a positive potential to base-two contact 12 through resistor 14. A potential gradient is thereby established within the body of device 10 between base-two 12 and base-one 11, the latter also being connected to the point of reference potential.

For a unijunction transistor of the type shown in FIG. 1, when a potential is applied to the emitter which is less positive than the potential established within the body in the region of the emitter, the rectifying contact is reverse-biased and very little current will flow. On the other hand, when the potential applied to the emitter is sufficiently positive so as to forward-bias the rectifying contact, current will easily flow into emitter 13 toward base-one 11, thereby changing the potential gradient and causing an increased current flow into base-two 12. The potential between the emitter and base-one at which the rectfiying contact will be forward-biased is equal to a fixed percentage of the potential between base-two and base-one. Consequently, when both potentials are derived from the same source, the time of conduction is relatively independent of supply voltage variations.

Connected between positive potential source 16 and reference potential is a series resistance-capacitance network comprising variable resistor 17 and capacitor 18 with the junction of the two elements connected to emitter 13. The circuit thus far described constitutes one form of unijunction relaxation oscillator, heretofore known in the art, in which capacitor 18 is charged through resistor 17 and is periodically discharged through the unijunction internal path between emitter 13 and base-one 11. In addition to the sawtooth waveform which appears on emitter 13, a negative-going spike in voltage appears on base-two 12 during the rapid discharge of capacitor 18.

In accordance with the invention, there is added to the basic relaxation oscillator circuit just described capacitor 19 with one end connected to base-two 12 and the other end connected to input 20 to which a source of sinusoidal voltage is connected. Capacitor 20 is simply a means of coupling the sinusoidal voltage variations from input 20 to base-two 12, thereby causing the base-two to base-one potential of unijunction transistor 10 to have a composite waveform. This waveform is made up of the sinusoidal voltage from input 20 superimposed on the D.C. voltage supplied from source 16 through resistor 14. Capacitor 21 and resistor 22 form a high pass filtering network which attenuates the sinusoidal voltage variations while effectively coupling to output 23 the voltage spikes which occur on base-two 12 during the conduction of device 10. Regardless of the phase of the sinusoidal voltage which is initially presented to the oscillator, the oscillations will adjust until the conduction of device 10, and hence the voltage spike on base-two 12, occurs at a pulse repetition period equal to the period, $T_s$ (reciprocal of frequency, $1/f$) of the applied sinusoidal voltage and at a predetermined phase of the sinusoidal waveform. For a sinusoidal voltage of constant magnitude, this predetermined phase is determined solely by the rate of change of the emitter 13 to base-one 11 potential which in turn is a function of the time constant of the resistor 17 and capacitor 18 combination. It is helpful in the discussion which follows to refer to this time constant in terms of the pulse repetition period of the free running, unsynchronized oscillations ($T_u$) which would occur if the sinusoidal voltage variations at input 20 are not present.

Figure 2:
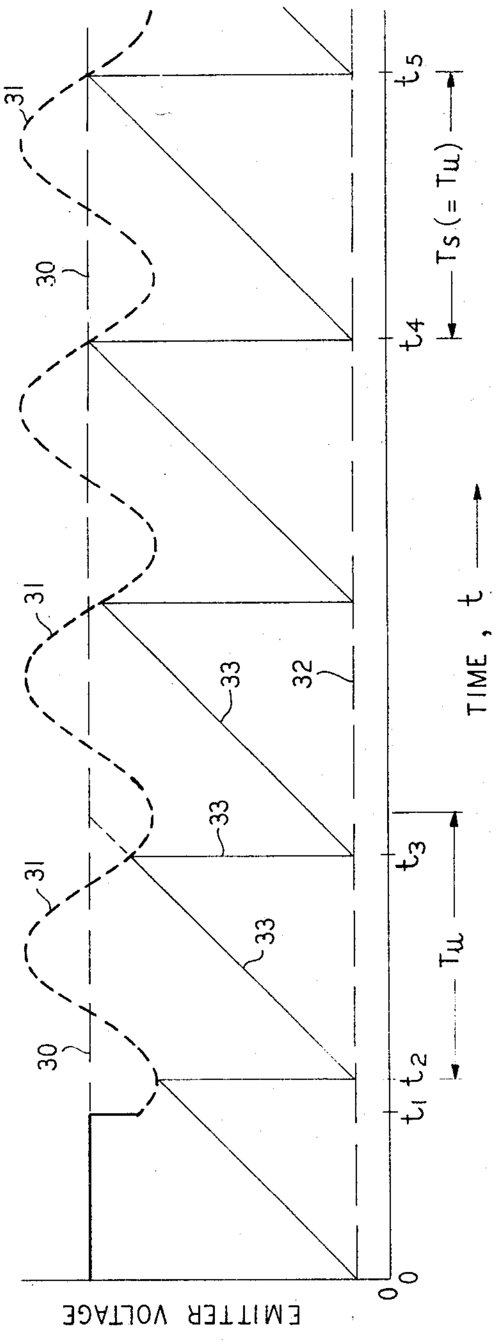

The operation of the circuit of FIG. 1 will be more clearly understood when considered in connection with the illustrative waveforms of FIGS. 2–5 wherein the emitter 13 voltage is plotted versus time. Referring now to FIG. 2, voltage level 30 indicates the emitter threshold voltage at which device 10 will conduct when the voltage on base-two 12 is only the D.C. potential from source 16 through resistor 14. As discussed hereinabove, this threshold voltage is a fixed percentage of the base-two to base-one potential for any given unijunction transistor. Accordingly, if at some time, $t_1$, a sinusoidal voltage of arbitrary phase is connected to input 20 causing a sinusoidal variation in the base-two to base-one potential, a corresponding sinusoidal variation must be indicated on the threshold voltage as shown by curve 31 in FIG. 2. Voltage level 32 indicates the voltage to which capacitor 18 is discharged when device 10 is in conduction. This voltage level is insufficient to keep device 10 in conduction; consequently, after capacitor 18 has been discharged to this level, it is again free to slowly recharge through resistor 17. The emitter 13 voltage, shown as curve 33, rises slowly from level 32 at a rate determined by the setting of resistor 17. As shown in FIG. 2, resistor 17 has been adjusted to a value at which the free running, unsynchronized relaxation oscillator would provide a pulse repetition period ($T_u$) equal to the period of the sinusoidal voltage ($T_s$).

At time, $t=t_2$, the emitter voltage reaches the threshold level indicated by curve 31 and capacitor 18 is rapidly discharged to level 32. After $t=t_2$, the emitter voltage rises, as shown in curve 33, toward a point at level 30 which is an interval $T_s$ ($=T_u$) past $t_2$, but capacitor 18 is discharged prematurely at $t=t_3$ when the emitter voltage reaches the threshold level 31. It should be noted however that phase of curve 31 at the second intersection ($t=t_3$) is closer to the negative-going zero crossing of the sinusoid than the phase at the first intersection ($t=t_2$). This convergence on the zero crossing will continue as shown in FIG. 2 until the conduction time of device 10 is in synchronism with the negative-going zero crossings of the sinusoidal voltage as shown at $t$ equal $t_4$ and $t_5$. This synchronism is maintained since any deviation therefrom causes a reconvergence on the negative-going zero crossing. Accordingly, the voltage spikes which occur on base-two 12 during the conduction of device 10, are coupled through capacitor 21 to output terminal 23 to provide output pulses at the instants of negative-going zero crossing of the sinusoid. Resistor 22 is low in value compared with the reactance of capacitor 21 at the frequency of the sinusoid, thereby providing a high pass filtering action which decreases the magnitude of the sinusoidal voltage passed to output terminal 23.

Figure 3:
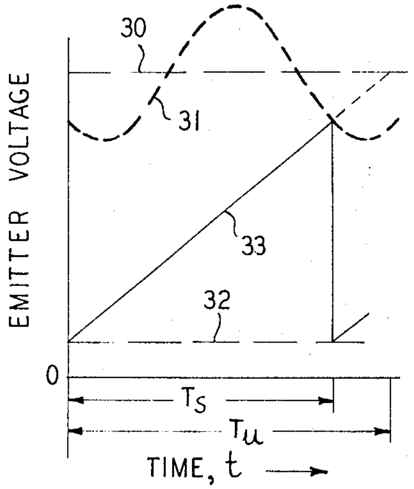

Referring now to FIG. 3, the steady state position of the conduction time is shown for the case where resistor 17 is adjusted so that $$\frac{T_u}{T_s}>1$$

For this case, a phase indicator circuit is provided wherein voltage spikes at base-two 12 are obtained at a constant phase point up to about 90 degrees later than the zero crossing point, i.e., between 180 degrees and 270 degrees on the input sinusoid. Unlike the case where $$\frac{T_u}{T_s}=1$$

the precise value of the ratio which is required for a particular phase other than zero crossing is dependent on the amplitude of the applied sinusoidal voltage.

Figure 4:
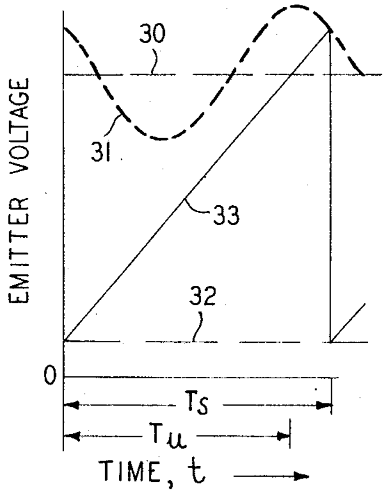

Referring now to FIG. 4, the steady state position of the conduction time is shown for the case where resistor 17 is adjusted so that $$\frac{T_u}{T_s}<1$$

For this setting, the voltage spikes are obtained at a constant point in phase up to about 90 degrees earlier than the zero crossing point, i.e., between 90 degrees and 180 degrees on the input sinusoid. Here again, as in the $$\frac{T_u}{T_s}>1$$

case, the precise ratio of $T_u/T_s$ which is required for a particular phase point is dependent on the amplitude of the applied sinusoidal voltage.

Figure 5:
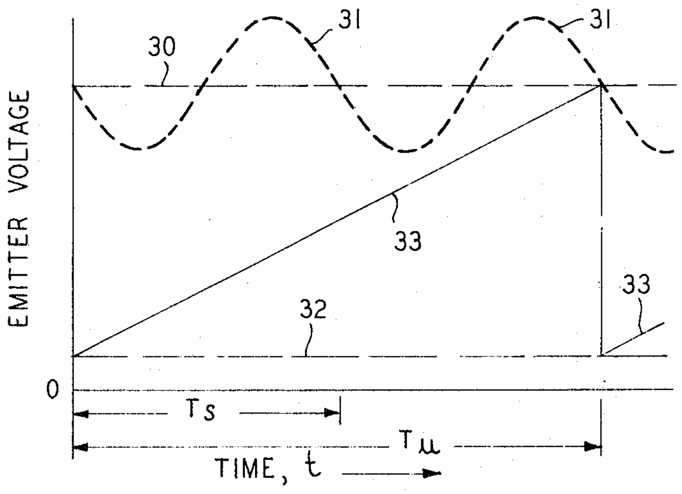

The circuit is not limited to providing indications of a particular phase in each cycle of the sinusoid but can also be utilized as a frequency divider. FIG. 5 shows the steady state position of the conduction time where resistor 17 is adjusted so that $$\frac{T_u}{T_s}=2$$

For this value of the ratio the circuit will provide a voltage spike at base-two 12 at every other negative-going zero crossing, thereby providing frequency division in addition to zero crossing detection. As will be appreciated by those skilled in the art, the circuit is, of course, not limited to a division by two, and higher integral values of the ration will provide even greater frequency division. In this connection however, it should be noted that a smaller sinusoidal voltage may be necessary in order to avoid having the last negative peak of sinusoid 31 prematurely intersect with the rising emitter voltage 33. Although a decrease in the amplitude of the sinusoid causes a decrease in the sensitivity of the circuit to the negative-going zero crossing, frequency divisions of up to ten have easily been attained.

What has been described hereinbefore is a specific illustrative embodiment of the present invention. It is to be understood that numerous other arrangements of physical parts and different components may be utilized with equal advantage. For example, capacitor 18 may be removed from its position as shown and placed in parallel with resistor 17, thereby resulting in a relaxation oscillator wherein the capacitor is charged when device 10 is in conductor and slowly discharged when device 10 is not in conduction. In addition, the type of unijunction transistor semiconductor materials may be changed with a corresponding change in the polarity of the voltage source. The invention is also in no way limited to synchronizing signals having a purely sinusoidal waveform since the invention can be advantageously utilized with any periodic waveform having a negative-going region, e.g., a triangular waveform.

Accordingly, it is to be understood that the above-described arrangement is merely illustrative of the application of the principles of the present invention and numerous modifications thereof may be devised by those skilled in the art without departing from the spirit and scope of the invention.

What is claimed is:

1. In combination, a relaxation oscillator having a unijunction transistor with an emitter and first and second base electrodes wherein a resistor-reactor combination connected to said emitter electrode provides a changing potential between said emitter and first base electrodes which causes said transistor to periodically conduct and develop voltage pulses at said second base electrode at a repetition rate of $T_u$ when said oscillator is unsynchronized, means for coupling a synchronizing sinusoidal voltage having a period of $T_s$ across said first and second base electrodes, high pass filtering means connected between said second base electrode and an output terminal for coupling the voltage pulses on said second base to said output terminal while attenuating the sinusoidal voltage, the instants at which the voltage pulses appear at said output terminal with relation to said sinusoidal voltage being dependent on the ratio of $T_u/T_s$.

2. The combination in accordance with claim 1 wherein $$\frac{T_u}{T_s}=1$$

and said output voltage pulses occur at the same instants as the negative-going zero crossings of said sinusoidal voltage.

3. The combination in accordance with claim 1 wherein $$\frac{T_u}{T_s}=n$$

where $n$ is an integer greater than one and said output voltage pulses occur only at every $n$th negative-going zero crossing of said sinusoidal voltage.

4. A relaxation oscillator for providing output pulses at a predetermined phase of an input sinusoidal voltage comprising an unijunction transistor having an emitter and at least two base electrodes, a direct-current potential source, first resistance means connecting said direct-current potential source to one of said base electrodes, means connecting the other of said base electrodes to a point of reference potential, second resistance means connecting said emitter electrode to said direct-current potential source, capacitor means connected to said emitter electrode, said capacitor means and said second resistance means being effective in causing the unijunction transistor to periodically conduct and produce voltage pulses at said one base electrode, means for connecting said input sinusoidal voltage across said base electrodes, high pass filtering means connected between said one base electrode and an output terminal for connecting said voltage pulses at said one base electrode to said output terminal while attenuating said sinusoidal voltage, the predetermined phase at which pulses appear at the output being dependent on the values of said capacitor means and said second resistance means.

5. A relaxation oscillator as defined in claim 4 wherein said capacitor means is connected between said emitter electrode and said point of reference potential.

6. A circuit for providing voltage pulses at the instants at which a sinusoidal voltage having a period of $T_s$ passes through its negative-going zero crossing points comprising a unijunction transistor having an emitter and two base electrodes, a direct-current potential source, a first resistor connected between said direct-current potential source and one of said two base electrodes, the other of said two base electrodes being connected directly to a reference potential, a capacitor connected between said emitter electrode and said reference potential, a second resistor connected between said emitter electrode and said direct-current potential source for charging said capacitor to a potential at which said unijunction transistor conducts and produces a voltage pulse at the one of said two base electrodes, the values of said capacitor and said second resistor being chosen such that voltage pulses occur at intervals of $T_s$, capacitor means for applying said sinusoidal voltage across said two base electrodes, and high pass filtering means connected between the one of said two base electrodes and an output terminal for attenuating said sinusoidal voltage while coupling said voltage pulses to said output terminal.

References Cited by the Examiner

UNITED STATES PATENTS

| | | | |
|---|---|---|---|
| 2,879,482 | 3/1959 | Mathis et al. | 307—88.5 |
| 3,142,024 | 7/1964 | Mordwinkin | 331—111 X |

OTHER REFERENCES

General Electric: Silicon Controlled Rectifier Manual, 2nd ed. December 29, 1961, p. 50.

References Cited by the Applicant

UNITED STATES PATENTS

| | | |
|---|---|---|
| 2,792,499 | 5/1957 | Mathis. |
| 2,801,340 | 7/1957 | Keonjian et al. |
| 2,863,056 | 12/1958 | Kankove. |
| 3,074,028 | 1/1963 | Mammano. |

NATHAN KAUFMAN, *Primary Examiner.*

ROY LAKE, *Examiner.*

S. H. GRIMM, *Assistant Examiner.*